United States Patent [19]

Isozumi

[11] Patent Number: 4,924,126

[45] Date of Patent: May 8, 1990

[54] SOLENOID FOR COAXIAL TYPE STARTER DEVICE

[75] Inventor: Shuzoo Isozumi, Himeji, Japan

[73] Assignee: Mitsubishi Denki Kabushiki Kaisha, Tokyo, Japan

[21] Appl. No.: 356,164

[22] Filed: May 24, 1989

[30] Foreign Application Priority Data

Jun. 3, 1988 [JP] Japan ................................ 63-138010
Aug. 29, 1988 [JP] Japan ................................ 63-214327

[51] Int. Cl.[5] .......................... H02K 5/15; H02K 3/04

[52] U.S. Cl. .......................................... 310/83; 310/23; 310/91; 310/208; 335/278; 336/225

[58] Field of Search ............... 74/7 A, 7 C; 290/38 R, 290/48; 123/179 M; 310/23, 83, 89, 91, 164, 208, 217; 335/278, 133; 336/225, 228

[56] References Cited

U.S. PATENT DOCUMENTS 1,455,188 5/1923 Cox .................................... 336/225
4,613,761 9/1986 Yabunaka .
4,760,274 7/1988 Isozumi .
4,795,932 1/1989 Long .................................... 310/89
4,800,766 1/1989 Isozumi et al. ....................... 74/7 A

FOREIGN PATENT DOCUMENTS 1311876 11/1962 France .

*Primary Examiner*—Patrick R. Salce
*Assistant Examiner*—D. L. Rebsch
*Attorney, Agent, or Firm*—Sughrue, Mion, Zinn, Macpeak and Seas

[57] ABSTRACT

A coaxial type starter device comprises an armature rotary shaft disposed in a dc motor, a rotary output shaft having a pinion at its one end and supported so as to be slidable in the axial direction, a solenoid-type an electromagnetic switch disposed in alignment with the axial line of the rotary output shaft, wherein the electromagnetic switch comprises a cylindrical casing surrounding through bolts extending in the axial direction along the inner circumferential surface of the casing, an exciting coil disposed in the casing and a plunger disposed at the inner part of the casing so as to be slidable in the axial direction. The exciting coil is in the shape of a race track in cross section and has a portion extending near the inner circumferential surface of the casing except for areas where the through bolts extend.

In another embodiment, through bolts are extended inside the yoke of the dc motor along its axial direction to thereby assemble the yoke, a housing covering the commutator of the motor and a front machine frame by fastening, and the electromagnetic switch is attached to the housing by means of fitting bolts which extend in a space between the exciting coil and the plunger of the electromagnetic switch.

5 Claims, 8 Drawing Sheets

SOLENOID FOR COAXIAL TYPE STARTER DEVICE

BACKGROUND OF THE INVENTION

1. Field of the Invention

The present invention relates to a coaxial type starter device for an automobile engine.

2. Discussion of Background

A conventional coaxial type starter device is so constructed as shown in FIG. 6. Namely, the starter device comprises a direct current (dc) motor 1 having an armature rotary shaft 1*a* in a tubular form, a driving force transmitting means 3 provided at an end in the axial direction of the dc motor 1 and including a planet gear speed reducing unit 2, an output rotary shaft 4 supported in the armature rotary shaft so that the torque of the armature rotary shaft 1*a* is transmitted to it through a driving force transmitting means 3 and it is slidable in its axial direction, a pinion 5 provided at an end or the front end of the output rotary shaft 4 and an electromagnetic switch 6 provided at the other end in the axial direction of the dc motor 1 so as to feed a current to the dc motor and to move the output rotary shaft by pushing the plunger rod 6*a*, wherein the armature rotary shaft 1*a* of the dc motor 1 is arranged in alignment with the plunger rod 6*a* of the electromagnetic switch 6.

In such conventional coaxial type starter device, the electromagnetic switch 6, the dc motor 1 and the front machine frame 7 which receives the driving force transmitting means 3 are assembled together by means of two through bolts 8. Namely, each of the through bolts 8 is inserted into an opening formed in a flange portion 6*c* formed at the outer periphery of the front end portion of the casing 6*b* of the electromagnetic switch 6, so as to extend along the outer circumferential surface of the yoke 1*b* of the dc motor 1 and to be engaged with a screw portion formed in the front machine frame 7, whereby the casing 6*b* of the electromagnetic switch 6 and the front machine frame 7 are respectively brought in close contact with both ends of the yoke 1*b* of the dc motor 1; thus these three machine elements are combined together to form the coaxial type starter.

In the conventional starter device having the above-mentioned construction, since the through bolts 8 for connecting the electromagnetic switch 6, the dc motor 1 and the front machine frame 7 together are located outside the dc motor body, the through bolts 8 become obstacles when the coaxial type starter device 1 is attached to the engine. Accordingly, the conventional coaxial type starter device is difficult to attach to the engine.

In order to eliminate the above-mentioned problem, there is such a proposal that through bolts 35 are inserted from the rear end surface of the casing 25 of an electromagnetic switch 24 so that the bolts 35 extend inside a dc motor 1 as shown in FIGS. 7 and 8 (which is a cross-sectional view taken along a line VIII—VIII in FIG. 7). In this case, however, the size of an exciting coil 28*c* for the electromagnetic switch 24 is restricted because the through bolts 35 occupy a substantial area in the dc motor 1. Accordingly, the amount of lead wire wound in the exciting coil 28*c* is also limited.

SUMMARY OF THE INVENTION

It is an object of the present invention to eliminate the disadvantage that a desired attractive force can not be obtained in the conventional starter device and to provide a coaxial type starter device capable of maintaining a desired magnetic attractive force while the outer diameter of the electromagnetic switch is unchanged.

In accordance with the present invention, there is provided a coaxial type starter device which comprises:

an armature rotary shaft disposed in a dc motor, a rotary output shaft having a pinion at its one end and supported so as to be slidable in the axial direction, an electromagnetic switch means disposed in alignment with the axial line of the rotary output shaft, the electromagnetic switch means comprising a cylindrical casing surrounding through bolts extending in the axial direction along the inner circumferential surface of the casing, an exciting coil disposed in the casing and a plunger disposed at the inner part of the casing so as to be slidable in the axial direction, wherein the exciting coil is in the shape of a race track in cross section and has a portion extending near the inner circumferential surface of the casing except for areas where the through bolts extend.

In another embodiment, there is provided a coaxial type starter device which comprises:

a dc motor having an armature rotary shaft in a tubular form, a driving force transmitting means disposed in the front of the dc motor and having an output rotary shaft with a pinion which is adapted to interlock with the ring gear of a car engine, and an electromagnetic switch disposed in the rear of the dc motor, and adapted to feed a current to the motor and to urge the output rotary shaft forwardly, wherein through bolts are extended inside the yoke of the dc motor along its axial direction to thereby assemble the yoke, a housing covering the commutator of the motor and a front machine frame by fastening, and the electromagnetic switch is attached to the housing by means of fitting bolts which extend in a space between an exciting coil and the plunger of the electromagnetic switch.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
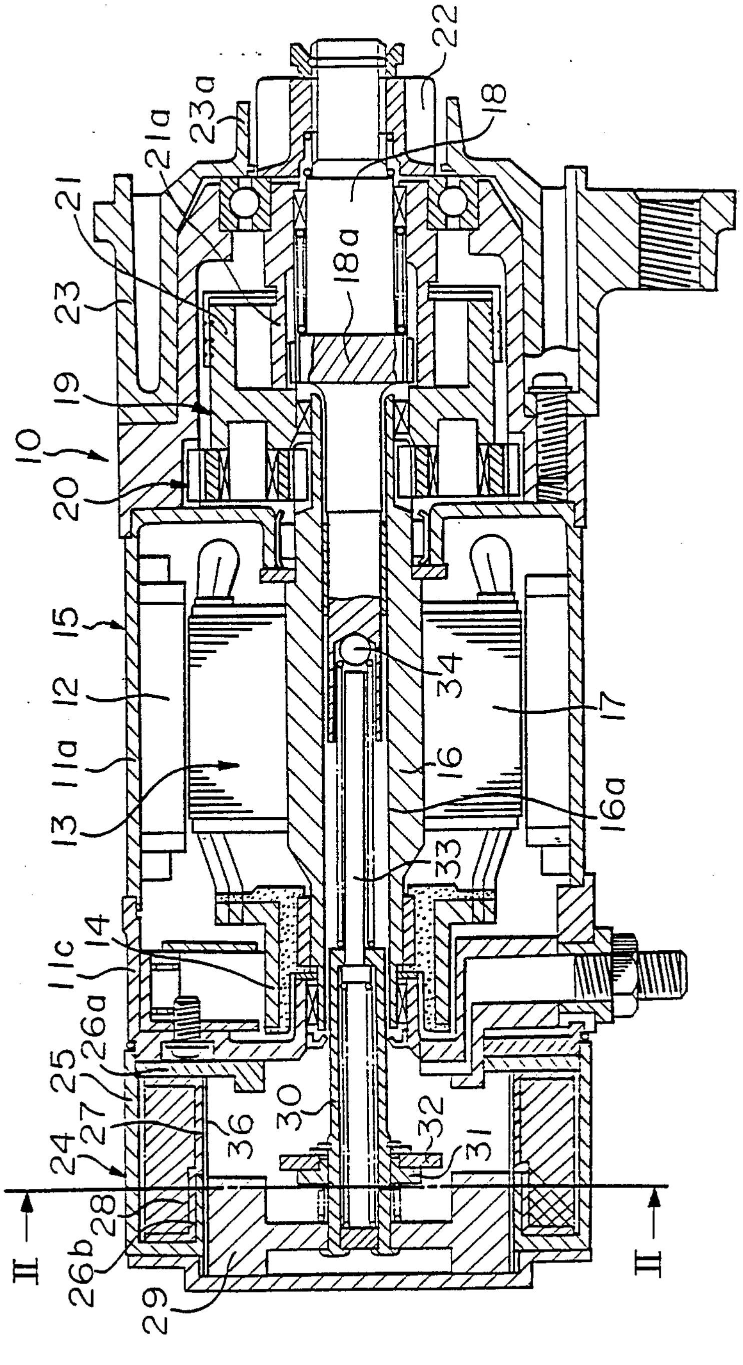
FIG. 1 is a longitudinal cross-sectional view of an embodiment of a coaxial type starter device according to the present invention.
Figure 2:
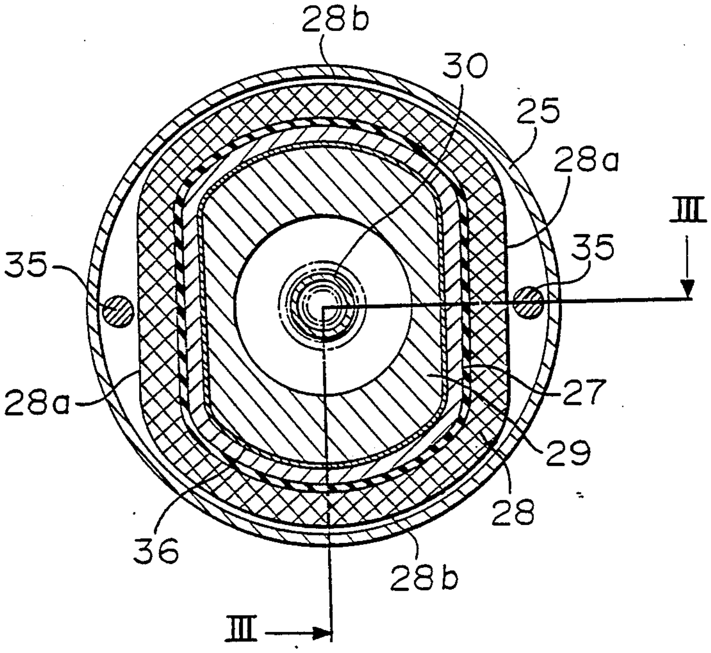
FIG. 2 is a cross-sectional view taken along a line II—II in FIG. 1.
Figure 3:
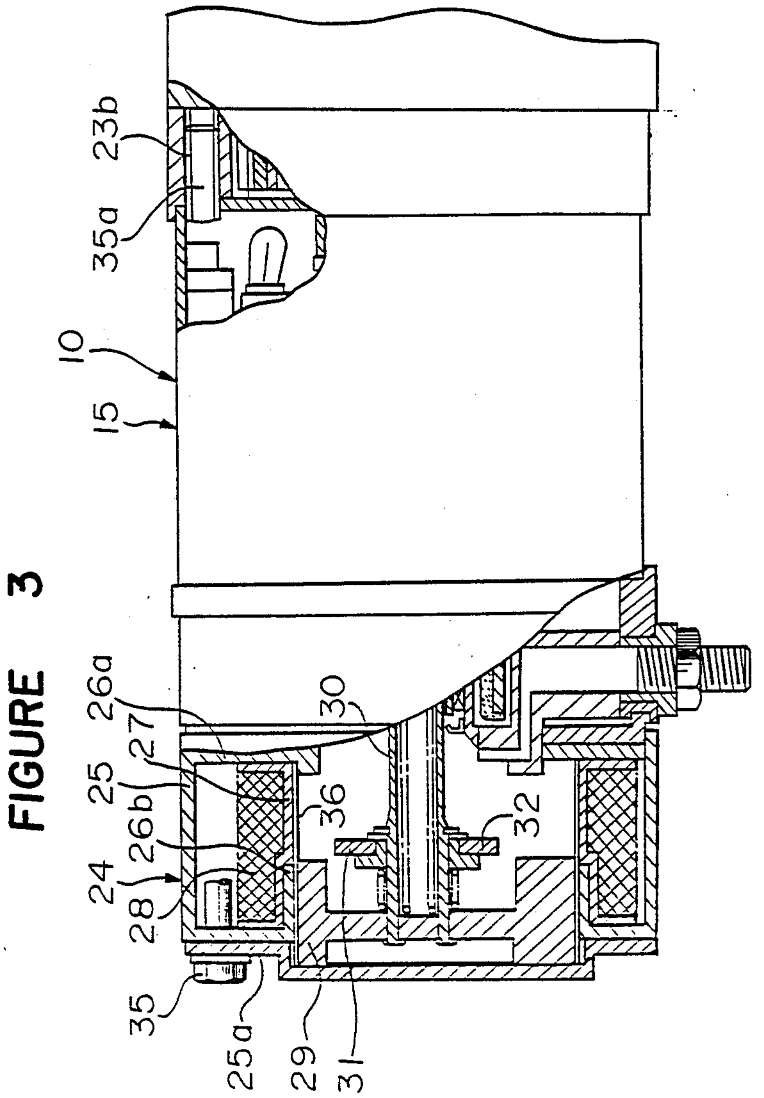
FIG. 3 is a side view of the coaxial type starter device shown in FIG. 1 wherein only the portion of an electromagnetic switch is cross-sectioned along a line III—III FIG. 2.

Referring to the drawings, wherein the same reference numerals designate the same or corresponding parts throughout the several views, and more particularly to FIGS. 1 to 3 thereof, there is shown an embodiment of the coaxial type starter device of the present invention.

The coaxial type starter device 10 of the present invention has a dc motor 15 comprising a yoke 11*a* which forms a magnetic circuit and constitutes an outer wall, a plurality of permanent magnets 12 firmly attached to the inner circumferential wall of yoke 11*a* with appropriate intervals in the circumferential direction, an armature 13 disposed at the central portion of the yoke 11*a* in a rotatable manner and a commutator 14 provided at an end of the armature 13.

The armature 13 is constituted by an armature rotary shaft 16 in a tubular form and an armature core 17 attached to the outer periphery of the rotary shaft. The rotation of the armature 13 is effected by transmitting a torque to a rotary output shaft 18 disposed at an end, i.e. at the front side (on the right side in FIG. 1) in the axial direction of the dc motor 15 by means of a driving force transmitting device 19. The driving force transmiting device 19 is constituted by a planet gear speed reducing unit 20, a one-way clutch device (an overrunning clutch device) 21 and a helical spline 18*a* formed in the rotary output shaft 18 so as to be interlocked with a clutch inner member 21*a* of the one-way clutch device. The rotary output shaft 18 is arranged on the same axial line as the armature rotary shaft 16 of the dc motor 15, and one end of the rotary output shaft 18 is inserted in the inner passage 16*a* of the armature rotary shaft 16 so that it is slidable in the axial direction by means of sleeve bearings interposed between the inner circumferential surface of the armature rotary shaft 16. A pinion 22 is attached to the rotary output shaft 18 at its front end so that it is projected from the front opening 23*a* formed in the front machine frame 23 which receives the driving force transmitting device 19 by a sliding movement of the rotary output shaft 18, whereby the pinion 22 is brought into mesh with a ring gear (not shown) of the engine.

An electromagnetic switch 24 is disposed at the rear side of a rear bracket 11*c* which is fitted to the rear end of the dc motor 15 in a manner to cause the rotary output shaft 18 to slide and to close a key switch (not shown) of the automobile to thereby feed a current from the battery to the dc motor 15. The solenoid-type electromagnetic switch 24 comprises an exciting coil 28 wound on a bobbin 27 of a plastic material which is supported by front and rear cores 26*a*, 26*b* which form a magnetic path in association with a casing 25, a plunger 29 disposed at the central bore of the bobbin 27 so as to be slidable, a tubular rod 30 of a non-magnetic substance whose one end is fixed to the plunger 29 and the other end is inserted in the inner passage 16*a* of the armature rotary shaft 16 from its rear end, and a movable contact 32 supported on the tubular rod 30 through an insulating material 31. A pushing rod 33 is slidably inserted in the tubular rod 30. The pushing rod 33 extends forwardly from the front opening of the tubular rod 30, and the front end of the pushing rod 33 is in contact with a recess formed at the end face of the output rotary shaft 18 through a steel ball 34.

The casing 25 of the electromagnetic switch 24 is in a cylindrical shape. Two through bolts 35 are extended in the axial direction and in the vicinity of the inner circumferential surface of the casing 25. The through bolts 35 are inserted through openings formed at the rear end 25*a* extending in the casing 25, the rear bracket 11*c* of the dc motor 15, spaces between the permanent magnets 12 in the yoke 11*a* so that threaded portions 35*a* of the through bolts 35 are respectively engaged with threaded holes 23*d* formed in the front machine frame 23 (FIG. 3). By the clamping force of the through bolts, the front machine frame 23, the yoke 11*a*, the rear bracket 11*c* and the casing 25 of the electromagnetic switch 24 are firmly connected together. The through bolts 35 occupy some space in the casing 25 so that the bulk of the exciting coil 28 is restricted. This causes a reduction in the magnetic attracting force of the electromagnetic switch 24. In the embodiment of the present invention, the exciting coil 28 is in a race track form to avoid inactivity of the plunger due to a decreased attracting force of the electromagnetic switch 24. For this purpose, the outer configuration of the plunger 29 is formed in a race track shape. The rear core 26*b* and the bobbin are respectively formed in a race track shape so as to correspond to the plunger 29.

The exciting coil 28 having a race track shape has a pair of opposing side surface portions 28*a* which extend in parallel to each other, each of the side surface portions being close to each of the through bolts 35 and a pair of opposing curved surface portions 28*b* which have substantially the same radius of curvature as the inner circumferential surface of the casing 25 and the curved surface portions respectively extend near the inner surface of the casing 25. Thus, it is possible to extend the outer circumferential part of the exciting coil to an annular space which would be occupied by the through bolts if the exciting coil were circular in the same manner as the conventional one. Accordingly, it is possible to prevent the magnetic attractive force from decreasing, and heat generated in the exciting coil is apt to be reduced by an increased volume of the exciting coil. Further, the use of a race-track-shaped plunger 29 hinders any turning caused by vibrations.

In FIGS. 1 to 3, numeral 36 designates a plunger guide bush.

Although the coaxial type starter device according to the above mentioned embodiment of the present invention uses a plunger 29 and an exciting coil 28 having a race track shape, they are not limited to such shape, and the same function and effect can be obtained by using an oval or polygonal shape for the plunger and the exciting coil as far as the plunger and the exciting coil of an oval or polygonal shape have portions extending near the inner circumferential surface of the casing 25 of the electromagnetic switch.

Figure 4:
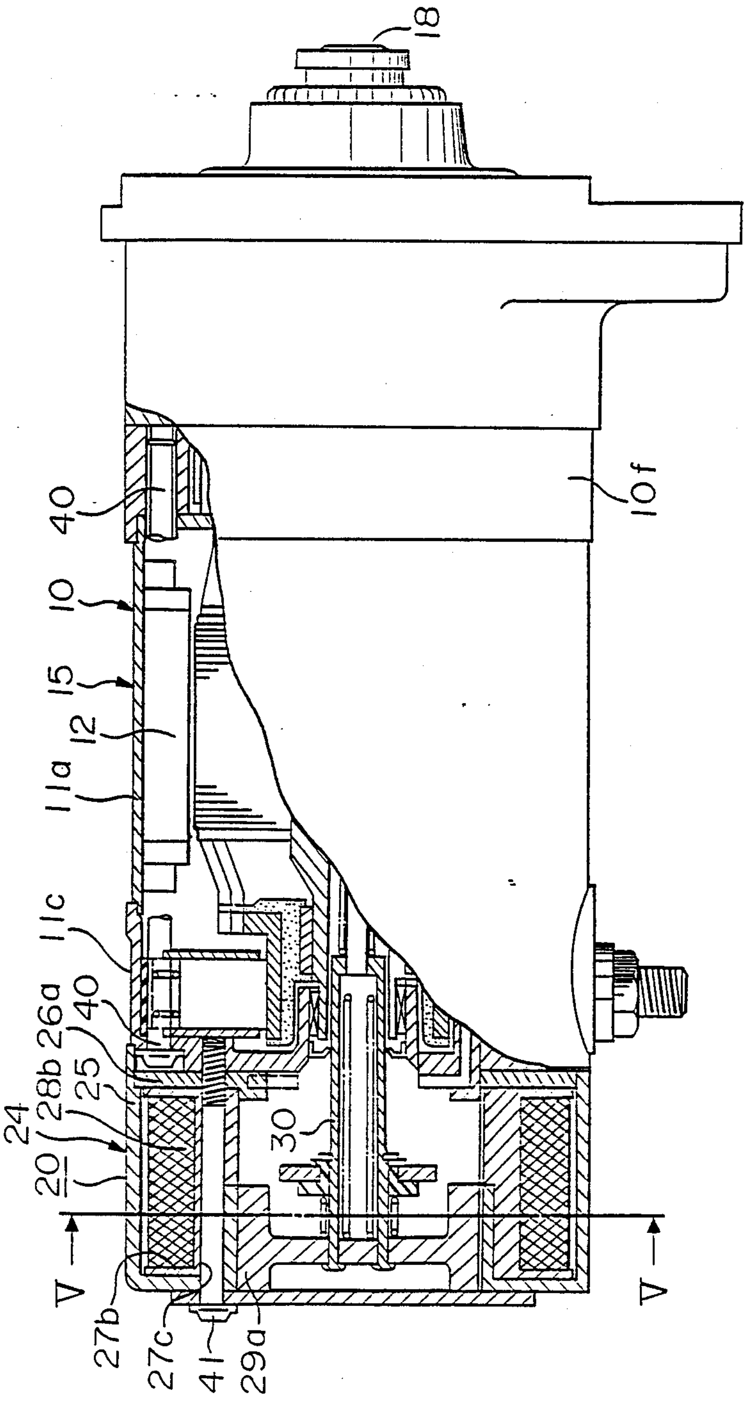
FIG. 4 is a front view partly cross-sectioned in the longitudinal direction of another embodiment of a coaxial type starter device of the present invention.
Figure 5:
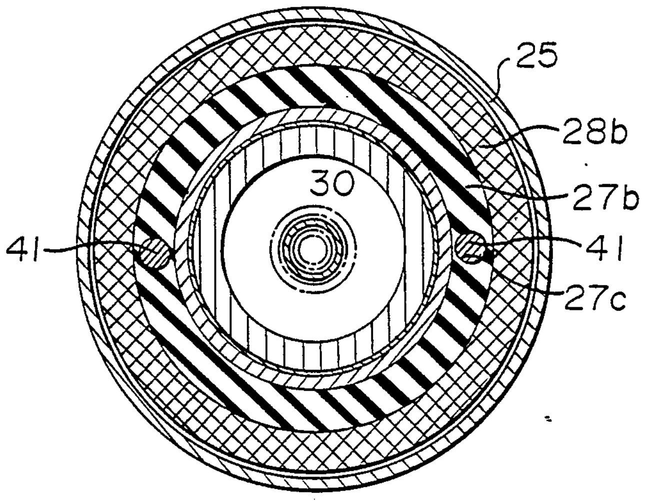
FIG. 5 is a cross-sectional view taken along a line V—V in FIG. 4.

FIGS. 4 and 5 show another embodiment of the present invention, wherein the same reference numerals as in FIGS. 1 to 3 designate the same or corresponding parts, and therefore a description of these parts is omitted. Through bolts 40 are extended in the yoke 11*a* of a dc motor 15 along its inner circumferential surface to connect a rear bracket 11*c*, the yoke 11*a* and a planet gear speed reducing device 10*f* together. A numeral 27*b* designates a bobbin as a structural element of an electromagnetic switch 24, and has a thick walled portion which is adjacent to a plunger 29*a* connected to a tubular rod 30. A bolt insertion hole 27*c* is formed in the thick-walled portion of the bobbin 27*b*. A fitting bolt 41 is inserted in the bolt insertion hole 27c and the free end of the fitting bolt is threaded in a female screw portion formed in the rear backet 11c; thus, the casing 25 of the electromagnetic switch 24 is firmly attached to the rear bracket 11c. Thus, by connecting the electromagnetic switch 24 to the rear bracket 11c by the fitting bolt 41 passing through the bolt insertion hole 27c formed in the thick-walled portion of the bobbin 27b which is disposed between the exciting coil 28b and a plunger 29b, the exciting coil 28b wound on the bobbin 27b can be extended to near the inner circumferential surface of the casing 25. Accordingly, the amount of lead wire wound in the exciting coil 28b can be increased in comparison with the conventional exciting coil as shown in FIGS. 6 and 7.

Figure 6:
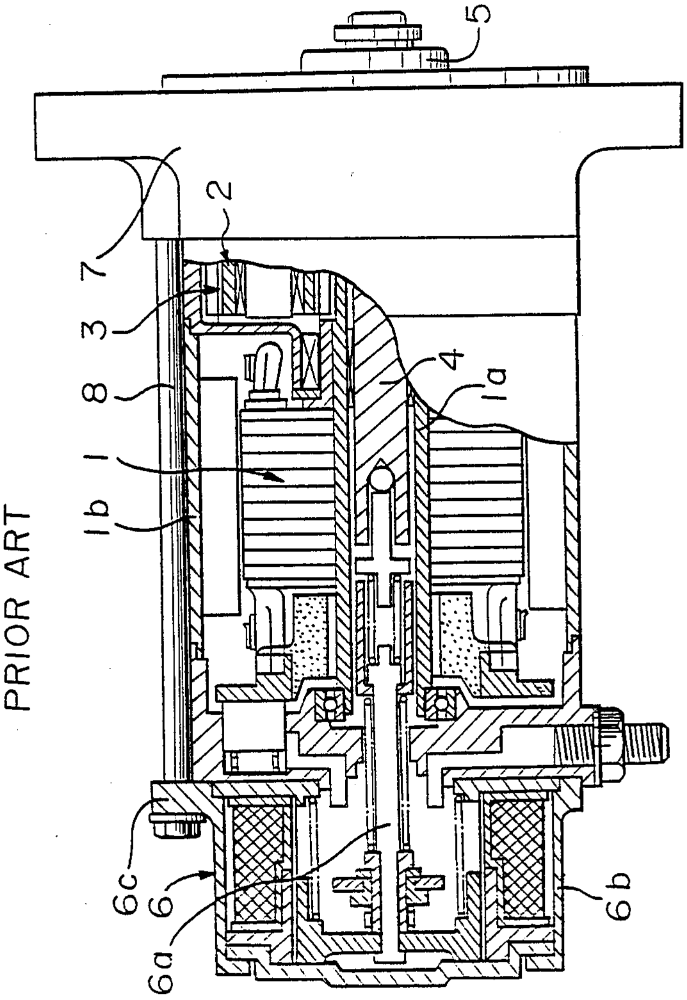
FIGURE 6 PRIOR ART
FIG. 6 is a longitudinal cross-sectional view partly omitted of a conventional coaxial type starter device.
Figure 7:
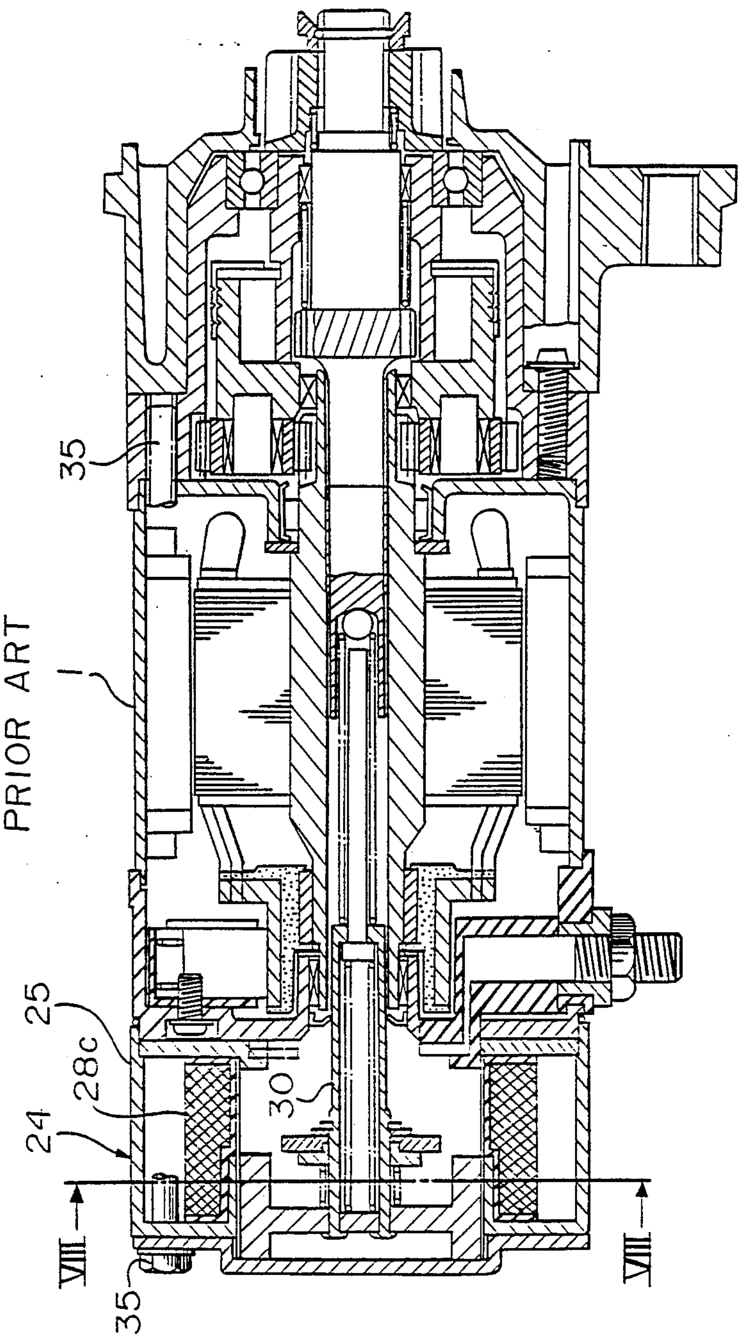
FIGURE 7 PRIOR ART
FIG. 7 is a longitudinal cross-sectional view of a conventional coaxial type starter device.
Figure 8:
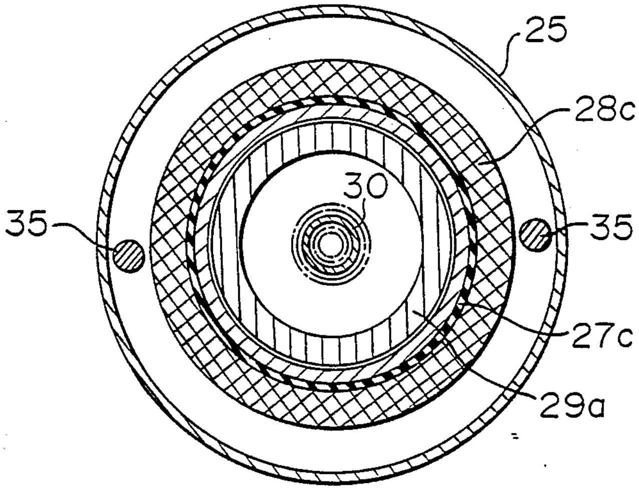
FIGURE 8 PRIOR ART
FIG. 8 is a cross-sectional view taken along a line VIII—VIII in FIG. 7.

When the outer diameter of the electromagnetic switch in which the exciting coil 28b having the construction as above-mentioned is the same as that shown in FIGS. 6 and 7, the amount of lead wire wound on the bobbin in the exciting coil 28b can be increased. Further, if a calorific value is the same between the exciting coils of the present invention and the conventional device, the efficiency of heat radiation in the exciting coil 28b as shown in FIGS. 4 and 5 is higher than that of the conventional device. Accordingly, temperature rise in the exciting coil can be suppressed and reduction of the attracting force is avoidable. When the amount of lead wire wound on the bobbin of the exciting coil 28b is the same as that in the conventional exciting coil as shown in FIGS. 7, 8, and the outer diameter of the electromagnetic switch can be reduced and the overall size of the device can be reduced.

It is preferable that the fitting bolt 41 is made of a non-magnetic substance. The thick-walled portion of the bobbin 27b may be formed in the shape of ring having a uniform thickness, or may be reduced except for a portion where the bolt insertion hole 27c is formed.

In the above-mentioned embodiments, permanent magnets 12 are used as means for producing a magnetic field in the dc motor 15. However, iron cores with coils may be used instead of the permanent magnets. The driving force transmitting means 9 may be or not may be provided with a planet gear speed reducing unit.

In the coaxial type starter device of the first embodiment, the use of an exciting coil having a non-circular shape in cross-section permits the through bolts to extend in the casing of the electromagnetic switch as well as the dc motor, and permits a larger exciting coil, whereby heat produced in the exciting coil can be easily reduced and a desired magnetic attracting force can be assured. Further, since the through bolts are contained in the starter device without being exposed outside, work for attaching the starter device to the engine can be remarkably improved.

In the starter device of the second embodiment, the amount of lead wire wound on the bobbin of the exciting coil can be increased without changing the outer diameter of the electromagnetic switch device; a calorific value per volume of the coil can be small; efficiency of heat radiation can be increased to thereby suppress temperature rise in the coil. A stable electromagnetic attracting force to move the rotary output shaft can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A coaxial type starter device which comprises:

an armature rotary shaft disposed in a dc motor, a rotary output shaft having a pinion at its one end and supported so as to be slidable in the axial direction, an electromagnetic switch means disposed in alignment with the axial line of said rotary output shaft, said electromagnetic switch means comprising a cylindrical casing surrounding through bolts extending in the axial direction along the inner circumferential surface of the casing, an exciting coil disposed in said casing and a plunger disposed at the inner part of said casing so as to be slidable in the axial direction, wherein said exciting coil is in the shape of a race track in cross section and has a portion extending near the inner circumferential surface of said casing except for areas where said through bolts extend.

2. The coaxial type starter device according to claim 1, wherein said through bolts are inserted through openings formed in the rear end of said casing to extend in spaces between permanent magnets in said dc motor, and a threaded portion formed at the free end of said through holes is screwed in respective screw portions formed in the front machine frame of the dc motor.

3. The coaxial type starter device according to claim 1, wherein said plunger and a bobbin mounted on the plunger are respectively in a shape of a race track in cross section.

4. A coaxial type starter device which comprises:

a dc motor having an armature rotary shaft in a tubular form, a driving force transmitting means disposed in the front of said dc motor and having an output rotary shaft with a pinion which is adapted to interlock with a ring gear of a car engine, and an electromagnetic switch disposed in the rear of said dc motor, and adapted to feed a current to said motor and to urge said output rotary shaft forwardly, wherein through bolts are extended inside a yoke of said dc motor along its axial direction to thereby assemble said yoke, a housing covers the commutator of the motor and a front machine frame by fastening, and said electromagnetic switch is attached to said housing by means of fitting bolts which extend in a space between an exciting coil and a plunger of said electromagnetic switch.

5. The coaxial type starter device according to claim 4, wherein said fitting bolts are made of a non-magnetic substance.

* * * * *